Dec. 27, 1949     J. E. OSTLINE     2,492,435
ELECTRIC MOTOR CONTROL CIRCUITS
Filed July 1, 1948
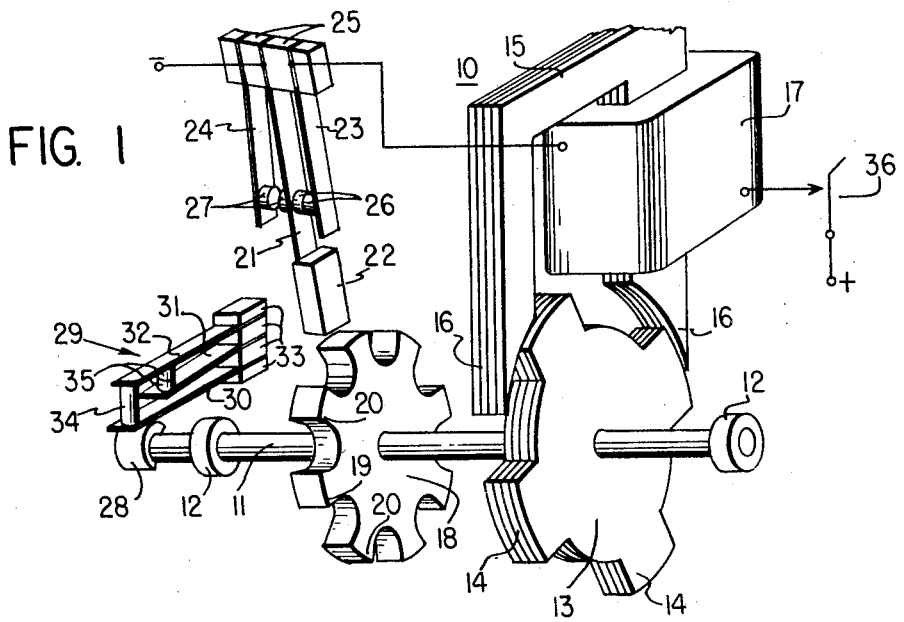
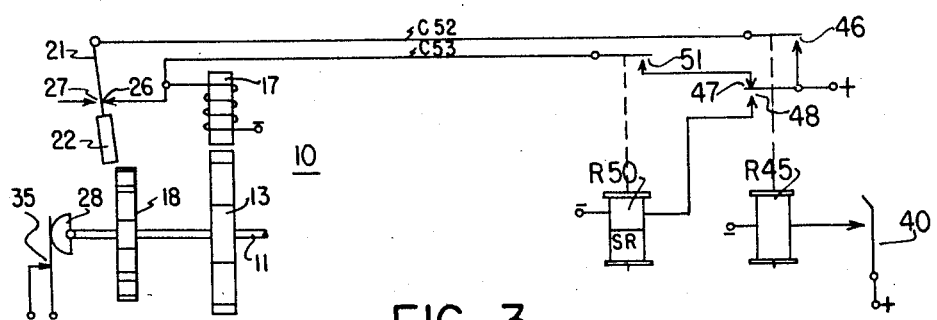
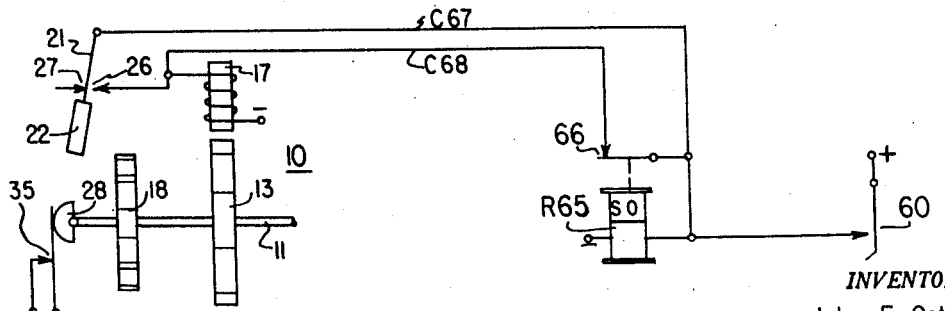
INVENTOR.
John E. Ostline
BY
*Smith, Olsen & Baird*
Attys.

Patented Dec. 27, 1949

2,492,435

UNITED STATES PATENT OFFICE 2,492,435

ELECTRIC MOTOR CONTROL CIRCUITS

John E. Ostline, Chicago, Ill., assignor to Automatic Electric Laboratories, Inc., Chicago, Ill., a corporation of Delaware Application July 1, 1948, Serial No. 36,371

6 Claims. (Cl. 172—36)

1

The present invention relates to electric motor control circuits and more particularly to starting and operating circuits for improved electric motors of the general character of that shown in U. S. Patent No. 2,266,037, granted on December 16, 1941, to Andrew F. Henninger et al.

It is a general object of the present invention to provide a control circuit for an electric motor of the type noted that is so connected and arranged that the electric motor is always started when the control circuit is closed regardless of the position in which the electric motor was previously stopped.

Another object of the invention is to provide a control circuit for an electric motor of the type noted that is so connected and arranged that when the control circuit is opened the electric motor is always stopped in a fixed re-start position.

A further object of the invention is to provide in combination with an electric motor of the type noted an improved and exceedingly simple control circuit for starting and for operating the electric motor.

Further features of the invention pertain to the particular arrangement of the circuit elements of the electric motor and the control circuit therefor whereby the above-outlined and additional operating features thereof are attained.

The invention both as to its organization and method of operation, together with further objects and advantages thereof, will best be understood by reference to the following specification taken in connection with the accompanying drawing in which Figure 1 is a fragmentary perspective view of an improved electric motor of the type noted and a diagrammatic illustration of an operating circuit therefor; Fig. 2 is a diagrammatic illustration of the electric motor shown in Fig. 1, together with a control circuit therefor embodying the present invention; and Fig. 3 is a diagrammatic illustration of the electric motor shown in Fig. 1, together with a modified form of control circuit therefor embodying the present invention.

Referring now more particularly to Fig. 1 of the drawing, the improved electric motor 10 of the type noted there-illustrated comprises a rotatable operating shaft 11 journaled in suitable laterally spaced-apart bearings 12 carried by a support, not shown. Also, the electric motor 10 comprises an armature 13 rigidly secured to the operating shaft 11 and formed of a stack of soft iron laminations, the armature 13 being provided with four substantially equally angularly spaced-apart poles 14. A substantially U-shaped field structure 15 formed of a stack of soft iron laminations is carried by the support, not shown, and provided with two angularly spaced-apart poles 16 cooperating with the poles

2

14. Also a field winding 17 is carried by one leg of the field structure 15. Further, a magnet structure 18 is rigidly secured to the operating shaft 11 in spaced-apart relation to the armature 13 and formed of a suitable permanent magnet material. Specifically, the magnet structure 18 may be formed of "Alnico" and comprises eight substantially equally angularly spaced-apart poles 19 and 20 of opposite sense, the characters 19 and 20 indicating south and north poles respectively. The armature 13 and the field magnet structure 18 are arranged in laterally spaced-apart relation on the operating shaft 11, as previously noted, and between the two laterally spaced-apart bearings 12.

Also, the electric motor 10 comprises a resilient element or reed 21 formed of spring steel or the like and carrying a permanent magnet 22 that may be formed of "Alnico" or the like. Specifically, one end of the reed 21 is rigidly secured to the support, not shown, and the other end of the reed 21 mounts the magnet 22, the magnet 22 being secured to the other end of the reed 21 in any suitable manner. The reed 21 and the permanent magnet 22 constitute a pendulum having a natural frequency of vibration that is determined primarily by the mass of the reed 21 and the magnet 22 and by the stiffness of the reed 21, which natural frequency may be assumed to be 40 cycles per second for purposes of illustration. It may be assumed that a north pole of the magnet 22 is disposed adjacent to the magnet structure 18 in cooperative relation with respect to the poles 19 and 20. The reed 21 comprises a normal position disposed laterally offset with respect to the magnet structure 18 so that when a south pole 19 of the magnet structure 18 is rotated adjacent to the north pole of the magnet 22, the attraction therebetween causes the reed 21 to be moved from its normal position laterally toward the magnet structure 18, and so that when a north pole 20 of the magnet structure 18 is rotated adjacent to the north pole of the magnet 22, the repulsion therebetween causes the reed 21 to be moved back through its normal position laterally away from the magnet structure 18. In fact, the reed 21 is moved alternately through its normal position between two extreme operative positions respectively disposed on opposite sides thereof as the magnet structure 18 is rotated due to the alternate attraction and repulsion between the south and north poles 19 and 20 respectively of the magnet structure 18 and the north pole of the magnet 22. Accordingly, it will be understood that when the operating shaft 11 is rotated ten revolutions per second, or six hundred revolutions per minute, the pendulum comprising the reed 21 and the magnet 22 is vibrated at its natural frequency of 40 cycles per second, or 2400 cycles per minute.

Also, the electric motor 10 comprises two contact springs 23 and 24 disposed on opposite sides of the reed 21 and also mounted upon the support, not shown. The reed 21 and the springs 23 and 24 are electrically insulated from each other at the fixed ends thereof by suitable intervening insulating strips 25 and carried by the support, not shown. The reed 21 and the spring 23 respectively carry the individual contacts 26 of a first pair and the reed 21 and the spring 24 respectively carry the individual contacts 27 of a second pair. Thus it will be understood that when the magnet 22 is moved laterally toward a south pole 19 of the magnet structure 18, the reed 21 opens the pair of contacts 27 and closes the pair of contacts 26, and conversely when the magnet 22 is moved laterally away from a north pole 20 of the magnet structure 18, the reed 21 opens the pair of contacts 26 and closes the pair of contacts 27. Accordingly, the contacts 26 are closed when the magnet 22 is attracted; and the contacts 27 are closed when the magnet 22 is repulsed. In view of the foregoing it will be appreciated that when the pendulum is vibrating at its natural frequency of 40 cycles per second, the pairs of contacts 26 and 27 are correspondingly opened and closed at this rate.

Further, the electric motor 10 comprises an impulsing cam 28 rigidly secured to the operating shaft 11 and an associated impulsing spring set 29 carried by the support, not shown. The spring set 29 includes three individual springs 30, 31 and 32 suitably insulated from each other by intervening insulating strips 33 and secured to the support, not shown. The outer end of the spring 30 rides directly upon the impulsing cam 28; while the outer end of the spring 32 carries an insulator 34 bearing against the outer end of the spring 30. Finally the springs 31 and 32 respectively carry the individual impulsing contacts 35 of a pair, which impulsing contacts 35 are alternately moved into engagement and disengagement as the spring 32 is alternately moved toward and away from the spring 31. Accordingly, when the operating shaft 11 is rotated at ten revolutions per second, the impulsing contacts 35 are operated to transmit ten impulses per second into an electric circuit, not shown, including the springs 31 and 32.

Finally, the electric motor 10 comprises an operating circuit including a source of direct current supply and a switch 36, together with the field winding 17, the reed 21, the spring 23 and the pair of contacts 26 arranged in series circuit relation. In the present arrangement the pair of contacts 27 is not included in any electric circuit; however, this useful pair of contacts may be employed for impulsing or other purposes in an obvious manner.

Considering now in greater detail the angular relation of the poles 14 of the armature 13 with respect to the poles 16 of the field structure 15 and the angular relation of the poles 19 and 20 of the magnet structure 18 with respect to the north pole of the magnet 22, it is pointed out that the armature 13 comprises four substantially equally angularly spaced-apart first positions of relatively low magnetic reluctance with respect to the field structure 15 when a pair of the poles 14 are disposed directly under the pair of poles 16; at which time a south pole 19 and north pole 20 of the magnet structure 18 are disposed substantially equally adjacent to the north pole of the magnet 22, whereby the magnet 22 is released permitting the reed 21 to be returned to its normal position opening the contacts 26 and 27. Also the armature 13 comprises four substantially equally angularly spaced-apart second positions of relatively high magnetic reluctance with respect to the field structure 15 when a pair of the poles 14 are disposed rearwardly of the first positions mentioned, one of the second positions being illustrated in Fig. 1; at which time a south pole 19 of the magnetic structure 18 is disposed adjacent to the magnet 22 whereby the magnet 22 is attracted causing the reed 21 to be moved from its normal position to close the contacts 26. Further, the armature 13 comprises four substantially equally angularly spaced-apart third positions of relatively high magnetic reluctance with respect to the field structure 15 when a pair of the poles 14 are disposed forwardly of the first positions mentioned; at which time a north pole 20 of the magnetic structure 18 is disposed adjacent to the north pole of the magnet 22, whereby the magnet 22 is repelled causing the reed 21 to be moved from its normal position to close the contacts 27.

Each of the second positions of the armature 13 constitutes a normal start position of the motor 10 since each of the second positions comprises a position of relatively high magnetic reluctance between the armature 13 and the field structure 15 and the contacts 26 are closed. On the other hand, each of the first positions of the armature 13 constitutes a run position of the motor 10 since each of the first positions comprises a position of relatively low magnetic reluctance between the armature 13 and the field structure 15 and the contacts 26 are opened. Should the armature 13 tend to come to rest in one of the first positions after operation of the motor 10 is arrested as a consequence of opening the switch 36, the magnet 22 repelling the adjacent north pole 20 and attracting the adjacent south pole 19 of the magnet structure 18 is capable of rotating the armature 13 into the next adjacent second position in order to prevent the armature 13 from finally stopping in one of the first positions. Finally, each of the third positions of the armature 13 constitutes a dead center position of the motor 10, even though each of the third positions comprises a position of relatively high magnetic reluctance between the armature 13 and the field structure 15, since the contacts 26 are opened. Accordingly, it will be understood that in the event the armature 13 should come to rest in one of the third positions after operation of the motor 10 is arrested as a consequence of opening the switch 36, it becomes impossible to restart the motor 10 merely by again closing the switch 36.

These operations will be better understood from the following description of the normal operation of the motor 10, assuming that the armature 13 occupies one of its second or normal start positions at this time, as illustrated in Fig. 1. When the switch 36 is closed a series circuit, including the contacts 26, is completed for energizing the field winding 17; whereby the magnetic flux set up in the field structure 15 causes the poles 16 to attract the poles 14 so that the armature 13 is rotated from its second position forwardly, or in the counter-clockwise direction as viewed from the right-hand end of the operating shaft 11, into its adjacent first position. When the armature 13 is rotated into its first position the magnet 22 is returned to its normal position, opening the contacts 26; whereby the circuit for energizing the field winding 17 is interrupted. The magnetic flux then decays in the field structure 15 permitting the momentum of the armature 13 to carry the operating shaft 11 further forwardly, the armature rotating into the adjacent one of its third positions; whereby the magnet 22 is repelled in order to close the contacts 27. Since the field winding 17 is deenergized at this time, the momentum of the armature 13 is adequate to carry the operating shaft 11 further forwardly; whereby the magnet 22 is no longer fully repelled so that it returns to its normal position opening the contacts 27. The momentum of the armature 13 is further adequate to carry the operating shaft 11 further forwardly; whereby the armature 13 is again rotated into the adjacent one of its second positions. At this time the magnet 22 is again attracted to close the contacts 26 so that the circuit for energizing the field winding 17 is again completed; whereby the magnetic flux in the field structure 15 causes the armature 13 to be rotated from its last-mentioned second position into the next adjacent one of its first positions initiating another of the above-described cycles. Accordingly, it will be understood that the armature 13 rotates continuously forwardly, causing the magnet 22 to be alternately attracted and repelled; whereby the pendulum, comprising the magnet 22 and the reed 21, vibrates at its normal frequency of 40 cycles per second, alternately opening and closing the contacts 26 and 27. In turn, the alternate opening and closing of the contacts 26 forty times per second causes the field winding 17 to be intermittently energized at this rate so that the armature 13 receives forty impulses per second to bring about rotation of the operating shaft 11 at a speed of ten revolutions per second. Thus it will be understood that the natural frequency of vibration of the pendulum, comprising the magnet 22 and the reed 21, sets the speed of the armature 13; whereby the motor 10 rotates the operating shaft 11 at the fixed speed. Specifically, the arrangement causes the operating shaft 11 of the motor 10 to rotate at a constant speed of ten revolutions per second corresponding to the natural frequency of 40 cycles per second of the pendulum, comprising the magnet 22 and the reed 21.

The intermittent operation of the contacts 26 and 27 at forty times per second may be utilized in any desirable manner in an exterior electric circuit, not shown, for the purpose of impulse transmission, of generating an alternating voltage, etc. Also, the rotation of the operating shaft 11 at ten revolutions per second causes the impulsing spring set 29 to transmit ten impulses per second at the impulsing contacts 35 over the associated electric circuit for any desired purpose.

Operation of the electric motor 10 may be arrested by opening the switch 36; whereby the armature 13 comes into a final stopped position in either one of its second positions, or in one of its third positions; and normally in one of its second positions. In the event the armature 13 tends to stop in one of its second positions after its momentum has been exhausted, it is accurately located therein by the attraction between the north pole of the magnet 22 and the adjacent south pole 19 of the magnet structure 18. Moreover, in the event the armature 13 tends to stop in one of its first positions after its momentum has been exhausted, it is moved therefrom into the adjacent one of its second positions by the reaction between the north pole of the magnet 22 and the adjacent north and south poles 20 and 19 respectively of the magnet structure 18, and is then accurately located in its adjacent second position in the manner described above.

In view of the foregoing it will be appreciated that after the switch 36 is opened, the armature 13 normally stops in one of its second positions, which constitutes a normal restart position; whereby operation of the motor 10 may be resumed upon again closing the switch 36.

However, in the event the armature 13 tends to stop in one of its third positions after its momentum has been exhausted, it comes to rest therein since the north pole of the magnet 22 is repelled by the associated north pole 20 of the magnet structure 18. The third positions of the armature 13 constitute dead center positions thereof as previously noted; whereby operation of the motor 10 may not be resumed merely by reclosing the switch 36, since the contacts 26 are opened. In the unfortunate event that the armature 13 stops in one of its third positions, it is necessary to jar the motor 10 or otherwise rotate the armature 13 to cause it to assume one of its second positions before normal operation of the motor 10 may be again resumed under the control of the switch 36.

In order to obviate the above-described difficulty inherent in the operating circuit of the motor 10, as illustrated in Fig. 1, an improved control circuit for the motor 10 is provided as illustrated in Fig. 2. Referring now to Fig. 2, the principal elements of the electric motor 10 are again diagrammatically illustrated in conjunction with the control circuit therefor embodying the features of the present invention. More particularly this control circuit comprises a switch 40, a relay R45 and a slow-acting relay R50 connected and arranged in a manner more fully described below.

The control circuit shown in Fig. 2 is so connected and arranged that after the switch 40 is opened the armature 13 is always arrested in one of its second positions; whereby the magnet 22 is attracted by one of the south poles 19 of the magnet structure 18 closing the contacts 26. In order to initiate operation of the motor 10, the switch 40 is closed completing an obvious circuit for operating the relay R45. Upon operating the relay R45 completes, at the contacts 46, a series operating circuit, including the conductor C52 and the contacts 26, for energizing the field winding 17; whereby the armature 13 is rotated at the fixed speed established by the natural frequency of the pendulum, including the magnet 22 and the reed 21, all in the manner previously described. Also upon operating the relay R45 completes, at the contacts 48, an obvious circuit for operating the slow-acting relay R50. Upon operating the slow-acting relay R50 prepares, at the contacts 51, an auxiliary circuit, including the conductors C53, and traced hereinafter, for energizing the field winding 17; which auxiliary circuit is open at this time at the contact 45 of the operated relay R45.

In order to arrest operation of the motor 10 the switch 40 is opened, causing the relay R45 to restore. Upon restoring the relay R45 interrupts, at the contacts 46, the operating circuit, including the conductor C52, for energizing the field winding 17; and completes, at the contacts 47, the auxiliary circuit, including the contacts 51 and the conductor C53, for energizing the field winding 17. Since the field winding 17 is directly energized, the armature 13 immediately stops in one of the first positions of low magnetic reluctance between the poles 14 of the armature 13 and the poles 16 of the field structure 15. Also, upon restoring the relay R45 interrupts, at the contact 48, the circuit for energizing the winding of the slow-acting relay R50; whereby the latter relay restores shortly thereafter. Upon restoring the slow-acting relay R50 interrupts, at the contacts 51, the auxiliary circuit for energizing the field winding 17; whereby the magnetic flux in the field structure 15 decays permitting the magnet 22 to rotate the armature 13 from its first position mentioned above into the adjacent one of its second positions. When the armature 13 is thus rotated into its adjacent second position mentioned, it comes to rest; whereby the magnet 22 closes the contacts 26. At this time operation of the motor 10 may again be resumed merely by closing the switch 40.

In view of the foregoing it will be understood that the control circuit for the electric motor 10, shown in Fig. 2, is so connected and arranged that when the switch 40 is opened to arrest operation of the electric motor 10, the armature 13 is always stopped in one of its second positions, which constitutes a normal restart position, so that operation of the electric motor 10 may always be resumed merely by again closing the switch 40.

In order to obviate the above-described difficulty inherent in the operating circuit of the motor 10, as illustrated in Fig. 1, an alternative improved control circuit for the motor 10 is provided, as illustrated in Fig. 3. Referring now to Fig. 3, the principal elements of the electric motor 10 are again diagrammatically illustrated in conjunction with the control circuit therefor embodying the features of the present invention. More particularly the control circuit comprises a switch 60 and a slow-acting relay R65 connected and arranged in a manner more fully described below.

The control circuit shown in Fig. 3 is so connected and arranged that the stop position of the armature 13 is immaterial, and for purpose of illustration it may be assumed that after the last operation of the motor 10 the armature 13 was arrested in one of its third positions causing the magnet 22 to open the contacts 26. In order to initiate operation of the motor 10, the switch 60 is closed completing an obvious circuit for energizing the winding of the slow-acting relay R65; whereby the latter relay operates shortly thereafter as it is of the slow-to-operate type. Also, when the switch 60 is closed, and prior to operation of the slow-acting relay R55, an auxiliary circuit, including the contacts 66 and the conductor C68, is completed for energizing the field winding 17. When the field winding 17 is thus energized the armature 13 is immediately rotated into one of its first positions due to the magnetic flux between the poles 16 of the field structure 15 and the poles 14 of the armature 13. When the slow-acting relay R65 then operates, it interrupts, at the contacts 66, the auxiliary circuit traced above for energizing the field winding 17. When the field winding 17 is thus deenergized, the magnetic flux in the field structure 15 decays so that the magnet 22 acting upon the magnet structure 18 rotates the armature 13 from its first position mentioned into its adjacent second position closing the contacts 26. When the contacts 26 are thus closed, an operating circuit, including the conductor C67 and the switch 60, is completed for energizing the field winding 17; whereby operation of the motor 10 is initiated in the manner previously explained. In order to arrest operation of the motor 10, it is only necessary to open again the switch 60; whereby the armature 13 is arrested either in one of its second positions or in one of its third positions; which, of course, is immaterial to restarting of the motor 10 when the switch 60 is again closed.

In view of the foregoing it will be understood that the control circuit for the electric motor 10, shown in Fig. 3, is so connected and arranged that when the switch 60 is closed operation of the electric motor 10 is always initiated regardless of the arrested position of the armature 13.

In view of the foregoing it is apparent that there has been provided in combination with an electric motor of the type noted, an improved control circuit that is so connected and arranged that operation of the electric motor is always initiated when the associated master or control switch is closed and without reference to the particular condition of the armature of the electric motor when prior operation thereof was arrested.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. In combination, an electric motor including a rotatable armature provided with a number of angularly spaced-apart poles, a stationary field structure provided with at least a pair of angularly spaced-apart poles cooperating with the poles of said armature, a field winding cooperating with said field structure, a rotatable magnet structure carried by said armature and provided with twice said number of angularly spaced-apart poles, a resilient element mounted for vibratory movement, a magnet carried by said element and provided with a pole cooperating with the poles of said rotatable magnet structure, said element and said magnet constituting a pendulum having a predetermined natural frequency of vibratory movement, the poles of said rotatable magnet structure being of alternate sense so that the pole of said magnet is alternately attracted and repelled by the poles of said rotatable magnet structure as said armature is rotated in order to effect vibratory movement of said pendulum, and a pair of contacts cooperating with said pendulum and alternately opened and closed by vibratory movement thereof, said armature having a plurality of angularly spaced-apart first positions of relatively low magnetic reluctance with respect to said field structure in which said contacts are opened and a plurality of angularly spaced-apart second positions of relatively high magnetic reluctance with respect to said field structure in which said contacts are closed and a plurality of angularly spaced-apart third positions of relatively high magnetic reluctance with respect to said field structure in which said contacts are opened, the attraction between the pole of said magnet and an unlike pole of said rotatable magnet structure being capable of rotating said armature when it is stopped in one of said first positions into the adjacent one of said second positions when said field winding is deenergized: an operating circuit including said contacts for energizing intermittently said field winding in order to effect rotation of said armature at a speed established by the natural frequency of vibratory movement of said pendulum, an auxiliary circuit excluding said contacts for energizing said field winding, and means for completing said auxiliary circuit in order to rotate said armature from one of said third positions into the adjacent one of said first positions, and then for interrupting said auxiliary circuit in order to permit rotation of said armature from said one first position into the adjacent one of said second positions.

2. In combination, an electric motor including a rotatable armature provided with a number of angularly spaced-apart poles, a stationary field structure provided with at least a pair of angularly spaced apart poles cooperating with the poles of said armature, a field winding cooperating with said field structure, a rotatable magnet structure carried by said armature and provided with twice said number of angularly spaced-apart poles, a resilient element mounted for vibratory movement, a magnet carried by said element and provided with a pole cooperating with the poles of said magnet structure, said element and said rotatable magnet constituting a pendulum having a predetermined natural frequency of vibratory movement, the poles of said rotatable magnet structure being of alternate sense so that the pole of said magnet is alternately attracted and repelled by the poles of said rotatable magnet structure as said armature is rotated in order to effect vibratory movement of said pendulum, and a pair of contacts cooperating with said pendulum and alternately opened and closed by vibratory movement thereof, said armature having a plurality of angularly spaced-apart first positions of relatively low magnetic reluctance with respect to said field structure in which said contacts are opened and a plurality of rearwardly disposed angularly spaced-apart second positions of relatively high magnetic reluctance with respect to said field structure in which said contacts are closed and a plurality of forwardly disposed angularly spaced-apart third positions of relatively high magnetic reluctance with respect to said field structure in which said contacts are opened, the attraction between the pole of said magnet and an unlike pole of said rotatable magnet structure being capable of rotating said armature when it is stopped in one of said first positions rearwardly into the adjacent one of said second positions when said field winding is deenergized; an operating circuit including said contacts for energizing intermittently said field winding in order to effect rotation of said armature forwardly at a speed established by the natural frequency of vibratory movement of said pendulum, an auxiliary circuit excluding said contacts for energizing said field winding, and means for completing said auxiliary circuit in order to rotate said armature from one of said third positions rearwardly into the adjacent one of said first positions and then for interrupting said auxiliary circuit in order to permit rotation of said armature from said one first position rearwardly into the adjacent one of said second positions.

3. In combination, an electric motor including a rotatable armature provided with a number of angularly spaced-apart poles, a stationary field structure provided with at least a pair of angularly spaced-apart poles cooperating with the poles of said armature, a field winding cooperating with said field structure, a rotatable magnet structure carried by said armature and provided with twice said number of angularly spaced-apart poles, a resilient element mounted for vibratory movement, a magnet carried by said element and provided with a pole cooperating with the poles of said rotatable magnet structure, said element and said magnet constituting a pendulum having a predetermined natural frequency of vibratory movement, the poles of said rotatable magnet structure being of alternate sense so that the pole of said magnet is alternately attracted and repelled by the poles of said rotatable magnet structure as said armature is rotated in order to effect vibratory movement of said pendulum, and a pair of contacts cooperating with said pendulum and alternately opened and closed by vibratory movement thereof, said armature having a plurality of angularly spaced-apart first positions of relatively low magnetic reluctance with respect to said field structure in which said contacts are opened and a plurality of angularly spaced-apart second positions of relatively high magnetic reluctance with respect to said field structure in which said contacts are closed and a plurality of angularly spaced-apart third positions of relatively high magnetic reluctance with respect to said field structure in which said contacts are opened, the attraction between the pole of said magnet and an unlike pole of said rotatable magnet structure being capable of rotating said armature when it is stopped in one of said first positions into the adjacent one of said second positions when said field winding is deenergized; an operating circuit including said contacts for energizing intermittently said field winding in order to effect rotation of said armature at a speed established by the natural frequency of vibratory movement of said pendulum, a switch operative to control said operating circuit, an auxiliary circuit excluding said contacts for energizing said field winding, and means responsive to operation of said switch to effect opening of said operating circuit for completing said auxiliary circuit in order to rotate said armature from one of said third positions into the adjacent one of said first positions and then for interrupting said auxiliary circuit in order to permit rotation of said armature from said one first position into the adjacent one of said second positions.

4. In combination, an electric motor including a rotatable armature provided with a number of angularly spaced-apart poles, a stationary field structure provided with at least a pair of angularly spaced-apart poles cooperating with the poles of said armature, a field winding cooperating with said field structure, a rotatable magnet structure carried by said armature and provided with twice said number of angularly spaced-apart poles, a resilient element mounted for vibratory movement, a magnet carried by said element and provided with a pole cooperating with the poles of said rotatable magnet structure, said element and said magnet constituting a pendulum having a predetermined natural frequency of vibratory movement, the poles of said rotatable magnet structure being of alternate sense so that the pole of said magnet is alternately attracted and repelled by the poles of said rotatable magnet structure as said armature is rotated in order to effect vibratory movement of said pendulum, and a pair of contacts cooperating with said pendulum and alternately opened and closed by vibratory movement thereof, said armature having a plurality of angularly spaced-apart first positions of relatively low magnetic reluctance with respect to said field structure in which said contacts are opened and a plurality of angularly spaced-apart second positions of relatively high magnetic reluctance with respect to said field structure in which said contacts are closed and a plurality of angularly spaced-apart third positions of relatively high magnetic reluctance with respect to said field structure in which said contacts are opened, the attraction between the pole of said magnet and an unlike pole of said rotatable magnet structure being capable of rotating said armature when it is stopped in one of said positions into the adjacent one of said second positions when said field winding is deenergized; an operating circuit including said contacts for energizing intermittently said field winding in order to effect rotation of said armature at a speed established by the natural frequency of vibratory movement of said pendulum, a switch operative to control said operating circuit, an auxiliary circuit excluding said contacts for energizing said field winding, a slow-acting relay, means responsive to operation of said switch to effect opening of said operating circuit for controlling said relay, and means governed by said relay for completing said auxiliary circuit in order to rotate said armature from one of said third positions into the adjacent one of said first positions and then for interrupting said auxiliary circuit in order to permit rotation of said armature from said one first position into the adjacent one of said second positions.

5. In combination, an electric motor including a rotatable armature provided with a number of angularly spaced-apart poles, a stationary field structure provided with at least a pair of angularly spaced-apart poles cooperating with the poles of said armature, a field winding cooperating with said field structure, a rotatable magnet structure carried by said armature and provided with twice said number of angularly spaced-apart poles, a resilient element mounted for vibratory movement, a magnet carried by said element and provided with a pole cooperating with the poles of said rotatable magnet structure, said element and said magnet constituting a pendulum have a predetermined natural frequency of vibratory movement, the poles of said rotatable magnet structure being of alternate sense so that the pole of said magnet is alternately attracted and repelled by the poles of said rotatable magnet structure as said armature is rotated in order to effect vibratory movement of said pendulum, and a pair of contacts cooperating with said pendulum and alternately opened and closed by vibratory movement thereof, said armature having a plurality of angularly spaced-apart first positions of relatively low magnetic reluctance with respect to said field structure in which said contacts are opened and a plurality of angularly spaced-apart second positions of relatively high magnetic reluctance with respect to said field structure in which said contacts are closed and a plurality of angularly spaced-apart third positions of relatively high magnetic reluctance with respect to said field structure in which said contacts are opened, the attraction between the pole of said magnet and an unlike pole of said rotatable magnet structure being capable of rotating said armature when it is stopped in one of said first positions into the adjacent one of said second positions when said field winding is deenergized; an operating circuit including said contacts for energizing intermittently said field winding in order to effect rotation of said armature at a speed established by the natural frequency of vibratory movement of said pendulum, a switch operative to control said operating circuit, an auxiliary circuit excluding said contacts for energizing said field winding, and means responsive to operation of said switch to prepare said operating circuit for completing said auxiliary circuit in order to rotate said armature from one of said third positions into the adjacent one of said first positions and then for interrupting said auxiliary circuit in order to permit rotation of said armature from said one first position into the adjacent one of said second positions.

6. In combination, an electric motor including a rotatable armature provided with a number of angularly spaced-apart poles, a stationary field structure provided with at least a pair of angularly spaced-apart poles cooperating with the poles of said armature, a field winding cooperating with said field structure, a rotatable magnet structure carried by said armature and provided with twice said number of angularly spaced-apart poles, a resilient element mounted for vibratory movement, a magnet carried by said element and provided with a pole cooperating with the poles of said rotatable magnet structure, said element and said magnet constituting a pendulum having a predetermined natural frequency of vibratory movement, the poles of said rotatable magnet structure being of alternate sense so that the pole of said magnet is alternately attracted and repelled by the poles of said rotatable magnet structure as said armature is rotated in order to effect vibratory movement of said pendulum, and a pair of contacts cooperating with said pendulum and alternately opened and closed by vibratory movement thereof, said armature having a plurality of angularly spaced-apart first positions of relatively low magnetic reluctance with respect to said field structure in which said contacts are opened and a plurality of angularly spaced-apart second positions of relatively high magnetic reluctance with respect to said field structure in which said contacts are closed and a plurality of angularly spaced-apart third positions of relatively high magnetic reluctance with respect to said field structure in which said contacts are opened, the attraction between the pole of said magnet and an unlike pole of said rotatable magnet structure being capable of rotating said armature when it is stopped in one of said first positions into the adjacent one of said second positions when said field winding is deenergized; an operating circuit including said contacts for energizing intermittently said field winding in order to effect rotation of said armature at a speed established by the natural frequency of vibratory movement of said pendulum, a switch operative to control said operating circuit, an auxiliary circuit excluding said contacts for energizing said field winding, a slow-acting relay, means responsive to operation of said switch to prepare said operating circuit for controlling said relay, and means governed by said relay for completing said auxiliary circuit in order to rotate said armature from one of said third positions into the adjacent one of said first positions and then for interrupting said auxiliary circuit in order to permit rotation of said armature from said one first position into the adjacent one of said second positions.

JOHN E. OSTLINE.

No references cited.

Certificate of Correction

Patent No. 2,492,435                           December 27, 1949

JOHN E. OSTLINE

It is hereby certified that errors appear in the printed specification of the above numbered patent requiring correction as follows:

Column 9, lines 24 and 25, strike out the word "rotatable" and insert the same in line 24 after "said" and before "magnet";

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*